United States Patent
Song et al.

(10) Patent No.: US 10,788,511 B2
(45) Date of Patent: Sep. 29, 2020

(54) METHOD FOR DETECTING ELECTRICAL CHARACTERISTICS OF INDIVIDUAL SOOT NANOPARTICLES AND APPLICATION THEREOF

(71) Applicant: TIANJIN UNIVERSITY, Tianjin (CN)

(72) Inventors: Chonglin Song, Tianjin (CN); Ye Liu, Tianjin (CN); Yuan Bi, Tianjin (CN); Gang Lv, Tianjin (CN)

(73) Assignee: TIANJIN UNIVERSITY, Tianjin (CN)

(*) Notice: Subject to any disclaimer, the term of this patent is extended or adjusted under 35 U.S.C. 154(b) by 0 days.

(21) Appl. No.: 16/465,061

(22) PCT Filed: Aug. 22, 2018

(86) PCT No.: PCT/CN2018/101746
§ 371 (c)(1),
(2) Date: May 29, 2019

(87) PCT Pub. No.: WO2019/072027
PCT Pub. Date: Apr. 18, 2019

(65) Prior Publication Data
US 2020/0241039 A1     Jul. 30, 2020

(30) Foreign Application Priority Data
Oct. 12, 2017   (CN) .......................... 2017 1 0951125

(51) Int. Cl.
*G01Q 60/40* (2010.01)
*G01Q 60/30* (2010.01)
(Continued)

(52) U.S. Cl.
CPC .............. *G01Q 60/40* (2013.01); *G01Q 60/30* (2013.01); *G01Q 60/42* (2013.01); *B82Y 35/00* (2013.01); *F01N 3/023* (2013.01)

(58) Field of Classification Search
CPC ........ G01Q 60/40; G01Q 60/30; G01Q 60/42; B82Y 35/00; F01N 3/023
See application file for complete search history.

(56) References Cited

FOREIGN PATENT DOCUMENTS

| CN | 201410014657.3 | 5/2014 |
| CN | 201410494759.X | 4/2016 |

(Continued)

OTHER PUBLICATIONS

Grob, B et al. "Conductivity for Soot Sensing: Possibilities and Limitations" Analytical Chemistry, vol. 84, (8), Mar. 19, (Mar. 19, 2012), pp. 3586-3592.

(Continued)

*Primary Examiner* — Nicole M Ippolito
*Assistant Examiner* — Hanway Chang
(74) *Attorney, Agent, or Firm* — Dragon Sun Law Firm, PC; Jianggao Li, Esq.

(57) ABSTRACT

The present disclosure discloses a method for detecting electrical characteristics of individual soot nanoparticles, wherein the electrical characteristics comprise conductance and work function. The conductance of individual soot nanoparticles is measured by a PF-TUNA mode of an atomic force microscope, and the work function of soot nanoparticles is measured by a KPFM mode of the atomic force microscope. The method mainly comprises steps of preparing a gold film substrate, sampling soot nanoparticles, measuring the conductance of individual soot nanoparticles, and measuring the work function of soot nanoparticles. The detection method of the present disclosure reduces the influence on the inherent characteristics of soot nanoparticles.

4 Claims, 3 Drawing Sheets

(51) Int. Cl.
*G01Q 60/42* (2010.01)
*B82Y 35/00* (2011.01)
*F01N 3/023* (2006.01)

(56) References Cited

FOREIGN PATENT DOCUMENTS

| | | |
|---|---|---|
| CN | 201610839479.7 | 3/2017 |
| CN | 201710951125.6 | 10/2017 |
| JP | 20090312 | 10/2013 |
| RU | 2013109604/06 | 8/2014 |

OTHER PUBLICATIONS

International Search Report for PCT/CN2018/101746.
Written Opinion for PCT/CN2018/101746.
RO/101 for PCT/CN2018/101746.

METHOD FOR DETECTING ELECTRICAL CHARACTERISTICS OF INDIVIDUAL SOOT NANOPARTICLES AND APPLICATION THEREOF

CROSS-REFERENCE TO RELATED APPLICATIONS

This application is a national stage application of PCT Application No. PCT/CN2018/101746. This application claims priority from PCT Application No. PCT/CN2018/101746, filed Aug. 22, 2018, and CN Application No. CN201710951125.6, filed Oct. 12, 2017, the contents of which are incorporated herein in the entirety by reference.

Some references, which may include patents, patent applications, and various publications, are cited and discussed in the description of the present disclosure. The citation and/or discussion of such references is provided merely to clarify the description of the present disclosure and is not an admission that any such reference is "prior art" to the present disclosure described herein. All references cited and discussed in this specification are incorporated herein by reference in their entireties and to the same extent as if each reference was individually incorporated by reference.

TECHNICAL FIELD

The present disclosure relates to a method for detecting soot nanoparticles and in particular to a method for detecting electrical characteristics of individual soot nanoparticles.

BACKGROUND OF THE PRESENT DISCLOSURE

At present, the influences of the soot nanoparticles produced by combustion on the environment and human health have drawn more and more attention. Relevant research institutions in China and abroad have done lots of researches on the harm of soot nanoparticles produced by combustion and have made a great progress. However, there are relatively few researches on the application of electrical characteristics of soot nanoparticles.

Previous researches on the electrical characteristics of soot nanoparticles are generally performed by tablet voltammetry. Since the compactness of tablets will affect the electrical characteristics of soot particles, the result is not accurate.

Therefore, a heretofore unaddressed need exists in the art to address the aforementioned deficiencies and inadequacies.

SUMMARY OF THE PRESENT DISCLOSURE

In order to overcome the deficiencies of the existing methods, an objective of the present disclosure is to provide a method for detecting electrical characteristics (e.g. conductance and work function) of individual soot nanoparticles, which studies the electrical characteristics of individual soot nanoparticles by an atomic force microscope and can accurately measure the electrical characteristics (e.g. conductance and work function) of individual soot nanoparticles. The measurement can provide a theoretical basis for the application of soot as electrical components.

In order to solve the above-mentioned technical problem, the present disclosure provides a method for detecting electrical characteristics of individual soot nanoparticles, wherein the electrical characteristics include conductance and a work function; the conductance of individual soot nanoparticles is measured by a PF-TUNA (Peak Force tunneling atomic force microscopy (hereinafter referred to as PF-TUNA) mode of an atomic force microscope, and the work function of individual soot nanoparticles is measured by a Kelvin-probe force microscopy (hereinafter referred to as KPFM) mode of the atomic force microscope; and the method includes the following steps:

step 1: preparing a gold film substrate: in a vacuum environment, plating a silicon dioxide layer having a thickness of 300 nm on a silicon wafer by resistive evaporation, then plating a titanium layer having a thickness of 10 nm on a surface of the silicon dioxide layer, and finally plating a gold film having a thickness of 80 nm on a surface of the titanium layer, where the roughness of the surface of the gold layer is less than 1.5 nm;

step 2: sampling: sampling substrates including the highly oriented pyrolytic graphite and the gold film substrate prepared in the step 1, the diameters of the sampling substrates are 10 mm, collecting soot nanoparticles at height above the burner from 10 mm to 30 mm on the highly oriented pyrolytic graphite and the gold film substrate prepared in the step 1 using a thermophoretic sampling system, the sampling time is 20 to 30 ms, and marking the two obtained simples and then placing them in a culture dish, respectively;

step 3: measuring the conductance of individual soot nanoparticles: mounting an OSCM-PT-R3 probe on the atomic force microscope, adjusting the atomic force microscope to a PF-TUNA mode, taking out, from the culture dish, the sample on the highly oriented pyrolytic graphite, selecting 20 to 30 individual soot nanoparticles on the highly oriented pyrolytic graphite, and obtaining a I-V curve of each of the selected individual soot nanoparticles; calculating a slope of the I-V curve by Nanoscope software to obtain a conductance value of each of the selected individual soot nanoparticles, calculating an average value of the conductance values of all the selected individual soot nanoparticles, and recording the average value as a conductance value of the sample; and step 4: measuring the work function of soot nanoparticles: mounting a MESP probe on the atomic force microscope, adjusting the atomic force microscope to a KPFM mode, and setting the distance from a tip of the probe to the gold film substrate as 100 nm;

4-1) fixing a gold film substrate prepared in the step 1 on a sample platform of the atomic force microscope by a conductive silver adhesive, selecting a plurality of regions on the gold film substrate, obtaining a potential difference between the tip of the probe and the surface of the gold film substrate in each region, calculating an average value of the potential differences between the tip of the probe and the surface of the gold film substrate in all the selected regions, and recording the average value as V1;

4-2) taking out, from the culture dish, the sample on the gold film substrate, fixing the gold film substrate on the sample platform of the atomic force microscope by the conductive silver adhesive, selecting a plurality of regions on the gold film substrate, obtaining a potential difference between the tip of the probe and the surface of the soot nanoparticles in each region, calculating an average value of the potential differences between the tip of the probe and the surface of the soot nanoparticles in all the selected regions, and recording the average value as V2; and 4-3) recording the work function of the soot nanoparticles on the gold film substrate as $\phi_{sample} = \phi_{gold\ film} + (V1-V2)$, where $\phi_{gold\ film}$ is the work function of the gold film.

Further, in the method for detecting electrical characteristics of individual soot nanoparticles in the present disclosure, the step 3 further includes the following steps: 3-1) fixing the highly oriented pyrolytic graphite with soot nanoparticles on a sample platform of the atomic force microscope by a conductive silver adhesive; and, 3-2) scanning the soot nanoparticles on the highly oriented pyrolytic graphite to obtain a morphological graph, selecting 20 to 30 individual soot nanoparticles from the morphological graph, and positioning and measuring each of the individual soot nanoparticles by a shoot and point function of the atomic force microscope to obtain an I-V curve of each of the individual soot nanoparticles.

By the method for detecting electrical characteristics of individual soot nanoparticles, a theoretical basis can be provided for future researches on the recycle of soot nanoparticles. That is, conductance values of three soot nanoparticle samples on the highly oriented pyrolytic graphite separately generated from height above the burner of 10 mm, 20 mm and 30 mm and work functions of three soot nanoparticle samples on the gold film substrate separately generated from height above the burner of 10 mm, 20 mm and 30 mm are obtained by the method for detecting electrical characteristics of individual soot nanoparticles described above. With the increase of the height above the burner, the electrical conductivity of soot nanoparticles is enhanced, and the ability of binding electrons in soot nanoparticles is weakened.

Compared with the prior art, the present disclosure has the following beneficial effects:
(1) compared with the measurement of electrical conductivity by voltammetry, the system can realize the accurate measurement of the conductance of individual soot nanoparticles. In addition, by measuring soot nanoparticles in a PF-TUNA mode, the influence on the inherent characteristics of soot nanoparticles is reduced.
(2) the electrical characteristics such as conductance and work function of the soot nanoparticles can be obtained by the method for detecting electrical characteristics of individual soot nanoparticles in the present disclosure. The measurement of the electrical characteristics can effectively provide a theoretical basis for the application of soot as electrical components. Meanwhile, by measuring the electrical characteristics of soot nanoparticles, a theoretical support can be provided for the optimization of control strategy of a Diesel Particulate Filter (DPF) regeneration, so that the purpose of saving oil and reducing emission can be realized.

BRIEF DESCRIPTION OF THE DRAWINGS

The accompanying drawings illustrate one or more embodiments of the present disclosure and, together with the written description, serve to explain the principles of the invention. Wherever possible, the same reference numbers are used throughout the drawings to refer to the same or like elements of an embodiment.

DETAILED DESCRIPTION OF EMBODIMENTS

The technical solutions of the present disclosure will be further described below in detail by specific embodiments with reference to the accompanying drawings. The specific embodiments to be described are merely for explaining the present disclosure, rather than limiting the present disclosure.

The present disclosure provides a method for detecting electrical characteristics of individual soot nanoparticles, wherein the electrical characteristics include conductance and a work function; the conductance of individual soot nanoparticles is measured by a PF-TUNA mode of an atomic force microscope, and the work function of individual soot nanoparticles is measured by a KPFM mode of the atomic force microscope; and the method includes the following steps.

Step 1: preparation of a gold film substrate: in a vacuum environment, a silicon dioxide layer having a thickness of 300 nm is plated on a silicon wafer by resistive evaporation, then a titanium layer having a thickness of 10 nm is plated on a surface of the silicon dioxide layer, and a gold film having a thickness of 80 nm is finally plated on a surface of the titanium layer, where the roughness of the surface of the gold layer is less than 1.5 nm, reducing the influence on individual soot nanoparticles.

Step 2: sampling: sampling substrates includes highly oriented pyrolytic graphite and the gold film substrate prepared in the step 1, and the diameters of the sampling substrates are 10 mm; an inverse diffusion burner is adopted, the fuel is n-heptane, the flow rate is 70 g/min, the heating temperature of the fuel is 150° C., and the flow rate of Ar in the fuel is 0.30 L/min; after the combustion flame is stabilized, soot nanoparticles at height above the burner of 10 mm are collected on the highly oriented pyrolytic graphite and the gold film substrate prepared in the step 1 using a thermophoretic sampling system, and the sampling time is 20 ms; and the two obtained samples are marked and placed in a culture dish, respectively.

Figure 1:
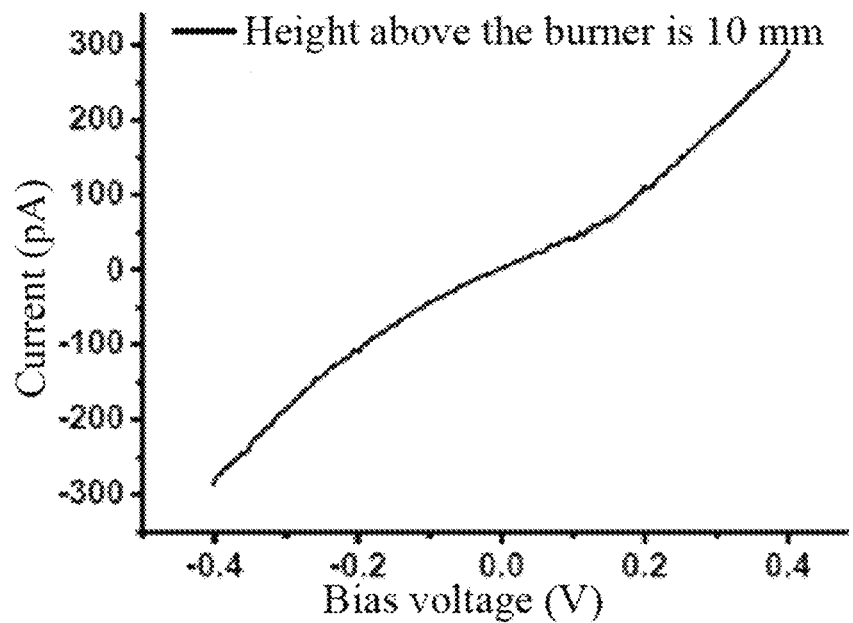
FIG. 1 is a diagram showing an I-V curve of individual soot nanoparticles.

Step 3: Measurement of the conductance of individual soot nanoparticles: an OSCM-PT-R3 probe is mounted on the atomic force microscope, the atomic force microscope is adjusted to a PF-TUNA mode, the sample on the highly oriented pyrolytic graphite is taken out from the culture dish, 20 to 30 individual soot nanoparticles on highly oriented pyrolytic graphite are selected, and an I-V curve of each of the selected individual soot nanoparticles is obtained, as shown in FIG. 1; a slope of the I-V curve is calculated by Nanoscope software to obtain a conductance value of each of the selected individual soot nanoparticles, and an average value of the conductance values of all the selected individual soot nanoparticles is calculated as a conductance value of the sample. The specific steps are as follows.

Step 3-1) The highly oriented pyrolytic graphite with soot nanoparticles is fixed on a sample platform of the atomic force microscope by a conductive silver adhesive.

Step 3-2) The soot nanoparticles on the highly oriented pyrolytic graphite are scanned to obtain a morphological graph, 25 individual soot nanoparticles from the morphological graph are selected, and each of the individual soot nanoparticles is positioned and measured by a shoot and point function of the atomic force microscope to obtain an I-V curve of each of the individual soot nanoparticles.

Step 4: Measurement of the work function of soot nanoparticles: an MESP probe is mounted on the atomic force microscope, the atomic force microscope is adjusted to a KPEM mode, and the distance from a tip of the probe to the gold film substrate is set as 100 nm.

Figure 3:
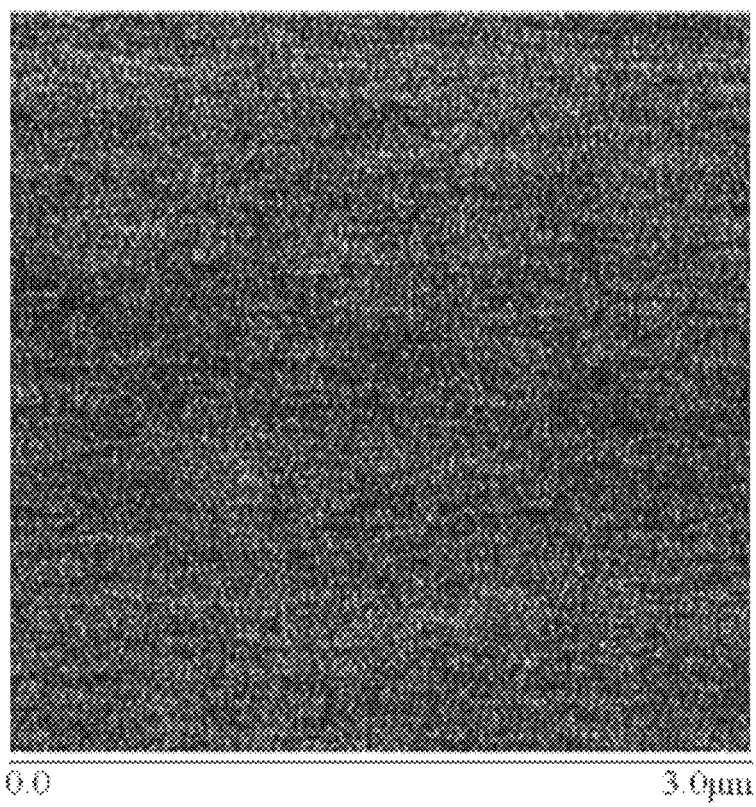
FIG. 3 is a surface potential diagram between a gold film and a probe according to an embodiment of the present disclosure.

Step 4-1) One gold film substrate prepared in the step 1 is fixed on the sample platform of the atomic force microscope by a conductive silver adhesive, five regions in 3×3 μm on the gold film substrate are selected and scanned to obtain a potential difference between the tip of the probe and the surface of the gold film substrate in each region, and an average value of the potential differences between the tip of the probe and the surface of the gold film substrate in all the selected regions is calculated and recorded as V1, as shown in FIG. 3.

Figure 4:
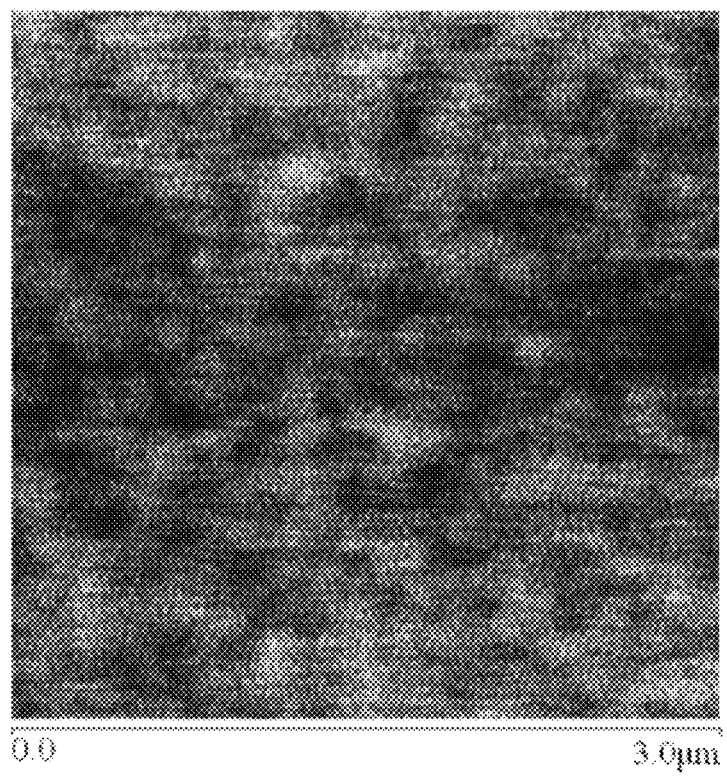
FIG. 4 is a surface potential diagram between soot nanoparticles and a probe according to an embodiment of the present disclosure.

Step 4-2) The sample on the gold film substrate is taken out from the culture dish, the gold film substrate is fixed on the sample platform of the atomic force microscope by the conductive silver adhesive, five regions in 3×3 μm on the gold film substrate are selected and scanned to obtain a potential difference between the tip of the probe and the surface of the soot nanoparticles in each region, and an average value of the potential differences between the tip of the probe and the surface of the soot nanoparticles in all the selected regions is calculated and recorded as V2, as shown in FIG. 4.

Step 4-3) The work function of the soot nanoparticles on the gold film substrate is recorded as $\phi_{sample}=\phi_{gold\,film}+(V1-V2)$, where $\phi_{gold\,film}$ is the work function of the gold film and is a known value of 5.1 eV.

Figure 2:
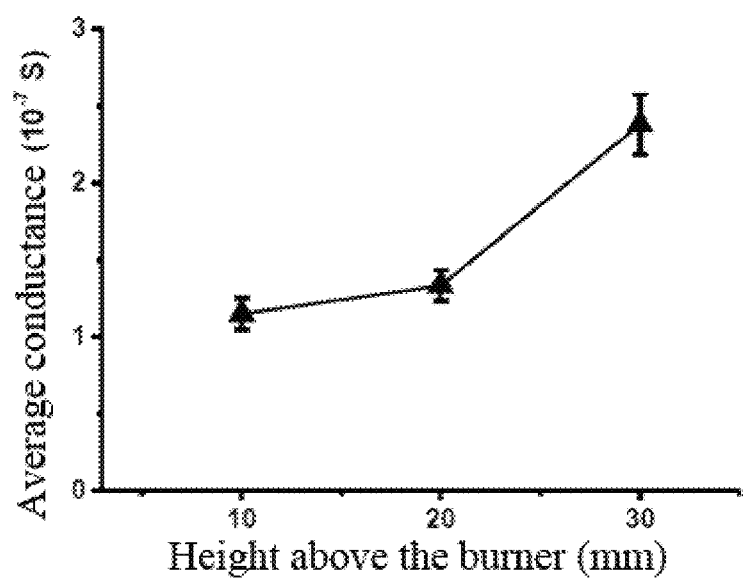
FIG. 2 shows the conductance of soot nanoparticles at various heights above the burner according to an embodiment of the present disclosure.
Figure 5:
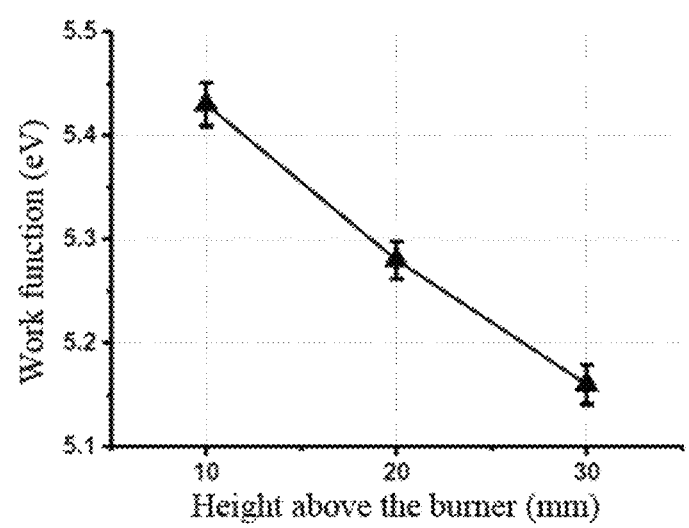
FIG. 5 shows a work function of soot nanoparticles at various heights above the burner according to an embodiment of the present disclosure.

Then, the highly oriented pyrolytic graphite with soot nanoparticles separately generated from heights above the burner of 20 mm and 30 mm of diffusion flame and the gold film with soot nanoparticles separately generated from heights above the burner of 20 mm and 30 mm of diffusion flame are fixed on the sample platform of the atomic force microscope, and operations are performed according to the method described above until the measurement of all soot nanoparticles is completed. The electrical characteristics such as conductance and work function of the soot nanoparticles at different heights above the burner of inverse diffusion flame are obtained, that is, the values of conductance and work function of the three soot nanoparticle samples are finally obtained. As shown in FIGS. 2 and 5, with the increase of the height above the burner, the electrical conductivity of the soot nanoparticles is enhanced, and the ability of binding electrons in the soot nanoparticles is weakened.

In conclusion, by the detection method of the present disclosure, the electrical characteristics such as conductance and work function of soot nanoparticles produced from different sources during the combustion process can be detected. The evolution obtained by the result of detection can assist in deeply understanding the transmission characteristics of electrons of soot nanoparticles, so that a theoretical basis is provided for the application of soot nanoparticles as electrical components. In addition, a theoretical support can be provided for the optimization of control strategy of a Diesel Particulate Filter (DPF) regeneration.

The foregoing description of the exemplary embodiments of the present disclosure has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A method for detecting electrical characteristics of individual soot nanoparticles, wherein the electrical characteristics comprise conductance and a work function, wherein the conductance of individual soot nanoparticles is measured by a Peak Force tunneling atomic force microscopy (PF-TUNA) mode of an atomic force microscope, and the work function of individual soot nanoparticles is measured by a Kelvin-probe force microscopy (KPFM) mode of the atomic force microscope; and the method comprises the following steps:

step 1: preparing a gold film substrate: in a vacuum environment, plating a silicon dioxide layer having a thickness of 300 nm on a silicon wafer by resistive evaporation, then plating a titanium layer having a thickness of 10 nm on a surface of the silicon dioxide layer, and finally plating a gold film having a thickness of 80 nm on a surface of the titanium layer, where the roughness of the surface of the gold layer is less than 1.5 nm;

step 2: sampling: sampling substrates including highly oriented pyrolytic graphite and the gold film substrate prepared in the step 1, the diameters of the sampling substrates are 10 mm, collecting soot nanoparticles at heights above burner from 10 mm to 30 mm on the highly oriented pyrolytic graphite and the gold film substrate prepared in the step 1 using a thermophoretic sampling system, the sampling time is 20 to 30 ms, and marking the two obtained simples and then placing them in a culture dish, respectively;

step 3: measuring the conductance of individual soot nanoparticles: mounting an OSCM-PT-R3 probe on the atomic force microscope, adjusting the atomic force microscope to a PF-TUNA mode, taking out, from the culture dish, the sample on the highly oriented pyrolytic graphite, selecting 20 to 30 individual soot nanoparticles on the highly oriented pyrolytic graphite, and obtaining a I-V curve of each of the selected individual soot nanoparticles; calculating a slope of the I-V curve by Nanoscope software to obtain a conductance value of each of the selected individual soot nanoparticles, calculating an average value of the conductance values of all the selected individual soot nanoparticles, and recording the average value as a conductance value of the sample; and step 4: measuring the work function of soot nanoparticles: mounting an MESP probe on the atomic force microscope, adjusting the atomic force microscope to a KPFM mode, and setting the distance from a tip of the probe to the gold film substrate as 100 nm;

step 4-1) fixing a gold film substrate prepared in the step 1 on a sample platform of the atomic force microscope by a conductive silver adhesive, selecting a plurality of regions on the gold film substrate, obtaining a potential difference between the tip of the probe and the surface of the gold film substrate in each region, calculating an average value of the potential differences between the tip of the probe and the surface of the gold film substrate in all the selected regions, and recording the average value as V1;

step 4-2) taking out, from the culture dish, the soot nanoparticle samples on the gold film substrate, fixing the gold film substrate on the sample platform of the atomic force microscope by the conductive silver adhesive, selecting a plurality of regions on the gold film substrate, obtaining a potential difference between the tip of the probe and the surface of the soot nanoparticles in each region, calculating an average value of the potential differences between the tip of the probe and the surface of the soot nanoparticles in all the selected regions, and recording the average value as V2; and step 4-3) recording the work function of the soot nanoparticles on the gold film substrate as $\phi_{sample} = \phi_{gold\,film} + (V1-V2)$, where $\phi_{gold\,film}$ is the work function of the gold film.

2. The method for detecting electrical characteristics of individual soot nanoparticles according to claim 1, wherein the step 3 comprises the following specific steps:

step 3-1) fixing the highly oriented pyrolytic graphite with soot nanoparticles on a sample platform of the atomic force microscope by a conductive silver adhesive; and step 3-2) scanning the soot nanoparticles on the highly oriented pyrolytic graphite to obtain a morphological graph, selecting 20 to 30 individual soot nanoparticles from the morphological graph, and positioning and measuring each of the individual soot nanoparticles by a shoot and point function of the atomic force microscope to obtain an I-V curve of each of the individual soot nanoparticles.

3. The method for detecting electrical characteristics of individual soot nanoparticles according to claim 1, wherein conductance values of three soot nanoparticle samples on highly oriented pyrolytic graphite separately generated from height above the burner of 10 mm, 20 mm and 30 mm and work functions of soot nanoparticles of three fold film substrate samples separately generated from height above the burner of 10 mm, 20 mm and 30 mm are obtained by the method for detecting electrical characteristics of individual soot nanoparticles; and with the increase of the height above the burner, the electrical conductivity of soot nanoparticles is enhanced, and the ability of binding electrons in soot nanoparticles is weakened.

4. The method for detecting electrical characteristics of individual soot nanoparticles according to claim 2, wherein conductance values of three soot nanoparticle samples on highly oriented pyrolytic graphite separately generated from height above the burner of 10 mm, 20 mm and 30 mm and work functions of soot nanoparticles of three fold film substrate samples separately generated from height above the burner of 10 mm, 20 mm and 30 mm are obtained by the method for detecting electrical characteristics of individual soot nanoparticles; and with the increase of the height above the burner, the electrical conductivity of soot nanoparticles is enhanced, and the ability of binding electrons in soot nanoparticles is weakened.

* * * * *